Oct. 21, 1969 — L. D. DUNN ET AL — 3,473,580

CONTOUR CUTTING ATTACHMENT FOR BAND SAW

Filed Jan. 25, 1967

Inventors:
Lyman D. Dunn
Stanley Gembicki
By: Hofgren, Wegner, Allen,
Stellman & McCord
Attorneys United States Patent Office 3,473,580
Patented Oct. 21, 1969

3,473,580
CONTOUR CUTTING ATTACHMENT
FOR BAND SAW
Lyman D. Dunn, Chicago, and Stanley Gembicki, Des Plaines, Ill., assignors to Marlan Company, a corporation of Illinois
Filed Jan. 25, 1967, Ser. No. 611,594
Int. Cl. B27b *13/04;* B27c *5/00*
U.S. Cl. 143—26                                    7 Claims

ABSTRACT OF THE DISCLOSURE

A self-contained unit for use with a powered saw, such as a band saw, including a rotatable template driven by the engagement between a driven pulley and a V-belt mounted about a recessed flange on the underside of the template, which flange is concentric to the configuration desired to be cut from a workpiece placed on the top of the template when the unit is placed adjacent a driven saw blade.

BACKGROUND OF THE INVENTION

Field of the invention

The invention relates to a device for use with band saws for cutting objects of irregular contour.

DESCRIPTION OF THE PRIOR ART

Heretofore, objects of irregular contour have been produced, in many instances, by blanking such items from a workpiece. For this purpose, special dies must be made. For each variation in size of the object, separate dies must be made. The expense in designing and producing such dies does not justify a small run of items of irregular configuration.

Some efforts have been made to provide a contour cutting attachment for use with a powered saw, the most pertinent of which are shown in Hawkins Patents Nos. 3,196,910 and 3,122,182. However, each of these structures are rather complex and expensive so as to not justify acquisition by a small producer. In addition, the structures shown in the Hawkins patents are not capable of a wide variation in size of workpiece handled and are not suitable for supporting and assisting in the cutting of workpieces which are not substantially rigid, particularly so-called "foam" products.

SUMMARY

This invention is directed, in brief, to the provision of a self-contained contour cutting attachment which may be used with a driven saw blade for cutting objects of irregular contour wherein different template members may be interchanged with the means for driving the template members without requiring any adjustments, assembly, or disassembly of the powered saw mechanism itself, nor in the contour cutting attachment, other than interchanging the template units. In addition, the invention is particularly directed to such a contour cutting attachment which is ideally suited for use in cutting non-rigid or spongy products, such as foam plastics, or the like.

It is, therefore, a primary object of this invention to provide a new and improved contour cutting attachment for a band saw.

Another object of this invention is to provide a contour cutting attachment for a band saw which may be operated in conjunction with a band saw by merely placing the same adjacent the band saw blade and which may further be changed to cut objects of different contour by merely interchanging template members without the need for any release of fastening means or the like.

Still another object of this invention is to provide a new and improved contour cutting attachment for a band saw blade which may accept workpieces of infinite dimensions, the only limitations being those imposed by the powered saw with which the attachment is to be used.

Other objects, features and advantages of the present invention will be apparent from the following description of the preferred embodiments illustrated in the accompanying drawings, in which:

DESCRIPTION OF THE PREFERRED EMBODIMENT

Figure 1:
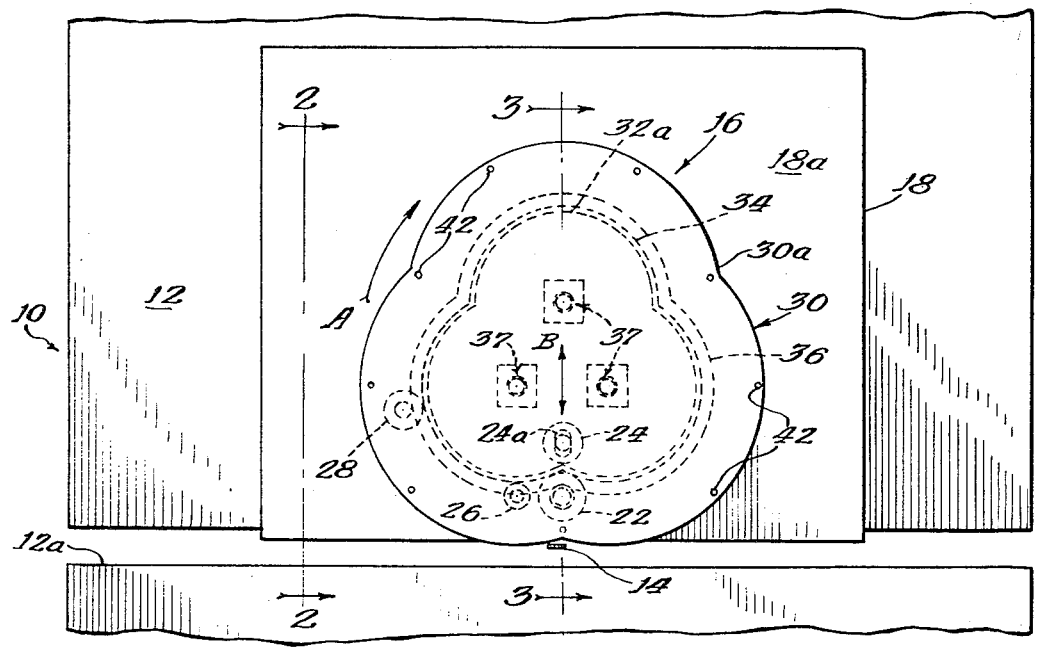
FIGURE 1 is a fragmentary top plan view of a band saw worktable with the contour cutting attachment of this invention placed on the worktable of a band saw adjacent the band saw blade.
Figure 2:
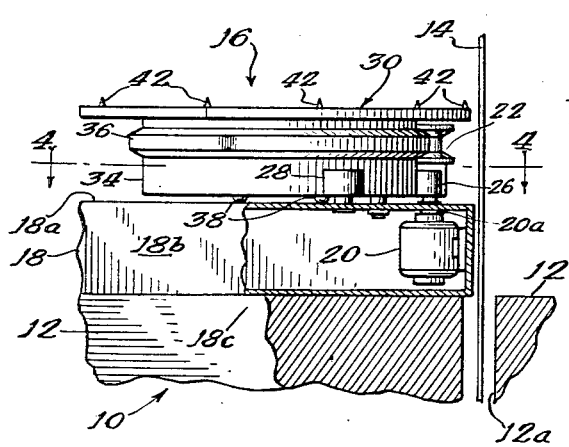
FIGURE 2 is a fragmentary section view, taken generally along the line 2—2 of FIGURE 1.
Figure 3:
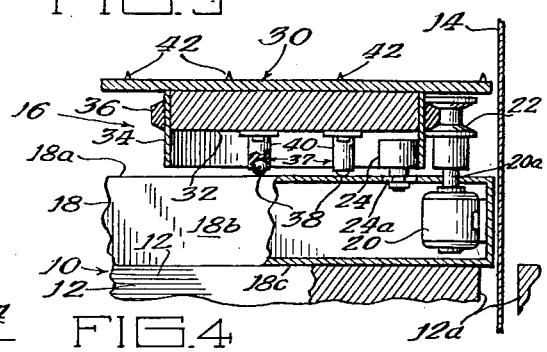
FIGURE 3 is a fragmentary section view, taken generally along the line 3—3 of FIGURE 1.
Figure 4:
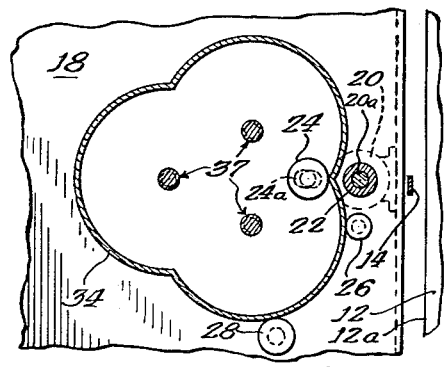
FIGURE 4 is a fragmentary section view, taken generally along the line 4—4 of FIGURE 2.

Referring now to the drawings, in FIGURE 1 there is shown a band saw 10 including a worktable 12 which has the usual slot 12a therein, in which a band saw blade 14 is positioned for travel through a generally upright path. The contour cutting attachment 16 of this invention is shown placed on the worktable 12 adjacent the slot 12a.

Contour cutting attachment 16 includes a box-like housing or frame means 18 including a top 18a, side walls 18b, and a base or bottom 18c. A power means or electric motor 20 is positioned in the interior of housing 18. The electric motor 20 is preferably provided with suitable means, such as lead wire connections, or the like (not shown) for connection to a source of electrical power in a well known fashion. Motor 20 drives motor shaft 20a which projects through the top 18a of the housing 18 and on which is fixed a drive member or pulley wheel 22 so that as motor 20 is actuated, pulley wheel 22 will be rotatably driven thereby.

In addition to supporting and driving pulley wheel 22, frame 18 also bears guiding elements or idler wheels 24, 26 and 28. These idler wheels extend above the top 18a for the same distance which is a height less than the height of pulley wheel 22. Idler wheel 24 is positioned directly across from pulley wheel 22 and idler wheel 26 is laterally displaced from, but closely adjacent, pulley wheel 22. Idler wheel 24 is preferably mounted in a slot 24a for movement toward and away from pulley 22. Idler 28 is remote from the wheels 22, 24 and 26 and could also be mounted in a slot (not shown) for adjustably positioning the idler within a given area, if desired.

A template member 30 having a periphery 30a of irregular contour is supported on top of housing 18. The underside of template 30 is provided with a template surface or inner template which includes a depending central area or boss 32. Boss 32 has a periphery 32a substantially the same as, but smaller than, the desired configuration to be cut from a workpiece placed on template 30. A flange 34 of suitable stiff material, such as sheet metal and the like, is secured to the periphery of, and depends below, boss 32 and provides a template guiding surface. This flange intimately follows the periphery of boss 32. The driving surface is provided on the inner template which, in the illustrated embodiment, takes the form of an inverted V-belt 36 which is fixed on flange 34 in the area of boss 32 and also closely follows the irregular periphery of boss 32.

Support means 37, preferably in the form of rollers or bearings 38 positioned in sleeves 40, depend from the underside of boss 32 to support the template 30 on the top 18a of housing 18. Template 30 is held at an elevation sufficient to align the inverted V-belt 36 with the pulley 22, and flange 34 with the surfaces of rollers 24, 26 and 28. Workpiece securing means, such as upstanding barbs 42, may be provided on the top surface of template 30 for holding a workpiece, such as foam plastic material, against movement relative to the template 30 as the same is driven.

In operation, a template 30 is chosen with the desired peripheral configuration which is to be imparted to the workpiece. All of the templates will be substantially the same as the template illustrated herein with the exception that the peripheral contour of the template and its depending boss will differ depending upon the desired configuration to be imparted to the workpiece. In other respects, including the inner template and the surfaces which engage the idler rollers and drive pulley, the template will be substantially the same. The template is placed on the top 18a of the housing 18 with the V-belt 36 matingly engaging pulley 22 and flange 34 positioned between pulley 22 and idler 24 and abutting idlers 26 and 38. The housing 18, now supporting the template 40, is placed on the worktable 12 of the band saw so that a line which intersects the axis of rollers 24 and 22 passes tangential to the cutting edge of the band saw blade 14. To assist in aligning the housing 18 properly, an indexing line could be formed on the side wall 18b which is adjacent the slot 12a. The workpiece is then placed on the top of template 30 and the template positioned closely adjacent blade 14 with the axis of pulley 22 and roller 24 aligned with the cutting edge of blade 14, as described When motor 20 is actuated, pulley 22 will rotate template 30 in the direction indicated by the arrow A in FIGURE 1, due to the frictional engagement between pulley 22 and inverted V-belt 36. Idler 24 will engage the inside edge of the flange 34, compensating for configurational changes in the flange by reciprocating in its slidable mounting, as indicated by the arrow B, in FIGURE 1. This relative reciprocation of idler 24 and fixed positioning of pulley 22 eliminates irregular movement or jerking as the template 20 is driven. The periphery of the template 30 will always be kept a fixed distance from the cutting edge of the band saw blade 14. Even though the peripheral configuration of the template is irregular, the fact that a fixed distance is maintained between the center of the driving pulley 22 and the edge of the band saw blade 14 assures that a workpiece placed on the top of the template 30 will be cut in the exact same configuration as the template 30 and its depending boss 32 as the pulley 22 rotates and constantly changes the center of rotation of template 30.

When it is desired to cut a workpiece in a different configuration, a different template 30 is positioned on housing 18 by simply withdrawing the first template and placing the second thereon without the need for dis-assembly of any elements and re-assembly of new components. Furthermore, when it is desired to convert the band saw 10 for normal band sawing operations, the housing 18 and template 30 are simply withdrawn therefrom, not being fixed or attached to the worktable 12 in any fashion. The capacity of the template 30 in relation to the height or number of layers of work product which may be placed thereon is limited only by the height of the band saw or the extent of the upright path of the blade 14. This unit and its different templates may be cheaply produced and thus lends itself to low production runs and/or acquisition by a small producer. The set-up time is almost eliminated in that the housing is merely positioned adjacent the band saw blade, the template 30 placed thereon, and a workpiece placed on top of the template. After that, the unit is actuated and no further personal attention is necessary other than to supply more workpieces to the template 30.

The foregoing detailed description has been given for clearness of understanding only, and no unnecessary limitations should be understood therefrom, as some modifications may be obvious to those skilled in the art.

We claim:

1. A contour cutting attachment for use with a powered saw for cutting workpieces into objects of irregular peripheral contour, comprising: means defining a frame; power means in said frame; a drive member connected to said power means and driven thereby; a template member for supporting a workpiece and having means thereon for holding the template member spaced from the frame and movable relative thereto; and means on the underside of said template member defining a template surface including a flange having a driving surface being adapted for driving engagement with said drive member for moving said template through a pattern cutting path said flange also having an idler surface generally opposite said driving surface, and an idler member mounted on said frame generally in opposition to said drive member and in a position for engagement with said idler surface.

2. The contour cutting attachment of claim 1 wherein the drive member is a pulley wheel and said template driving surface is provided with an inverted V-belt positioned to engage the pulley for driving the template member responsive to actuation of said power means.

3. The contour cutting attachment of claim 1 wherein said idler roller opposite said drive member is counted in the frame for movement responsive to engagement with said guiding surface toward and away from said drive member.

4. The contour cutting attachment of claim 3 wherein said attachment is provided with guide elements which include another idler roller closely spaced from said drive member in the direction of travel of the template member and on the same side of the template guiding surface as the drive member.

5. The contour cutting attachment of claim 4 wherein said guide elements include another idler roller spaced from the other rollers in the direction of travel of the template member.

6. The contour cutting attachment of claim 5 wherein the template member is generally, in plan, the same size and shape with respect to contour as the finished product to be cut from a workpiece positioned on the template member.

7. The contour cutting attachment of claim 6 wherein the drive member is a pulley wheel and said template driving surface is provided with an inverted V-belt positioned to engage the pulley for driving the template member responsive to actuation of said power means.

References Cited
UNITED STATES PATENTS

| | | |
|---|---|---|
| 1,285,801 | 11/1918 | Rudy. |
| 2,678,070 | 5/1954 | Davis. |
| 2,125,239 | 7/1938 | Hawes. |
| 3,196,910 | 7/1965 | Hawkins. |

DONALD R. SCHRAN, Primary Examiner

U.S. Cl. X.R.

83—413; 144—145